(12) United States Patent
Miller

(10) Patent No.: US 6,184,876 B1
(45) Date of Patent: *Feb. 6, 2001

(54) METHOD AND APPARATUS FOR AUDIBLY COMMUNICATING COMPARISON INFORMATION TO A USER

(75) Inventor: John David Miller, Beaverton, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/677,772

(22) Filed: Jul. 10, 1996

(51) Int. Cl.⁷ ....................................... G09G 5/08
(52) U.S. Cl. ........................... 345/302; 345/348; 345/978
(58) Field of Search ..................... 395/806, 133, 395/2.8; 345/302, 433, 348, 349, 978; 707/502; 340/825.19

(56) References Cited

U.S. PATENT DOCUMENTS

| | | | |
|---|---|---|---|
| 4,974,174 | * 11/1990 | Kleinman | 345/433 |
| 5,223,828 | * 6/1993 | McKiel, Jr. | 340/825.19 |
| 5,287,102 | * 2/1994 | McKiel, Jr. | 340/825.19 |
| 5,374,924 | * 12/1994 | McKiel, Jr. | 340/825.19 |
| 5,428,723 | * 6/1995 | Ainscow et al. | 395/135 |
| 5,463,722 | * 10/1995 | Venolia | 395/133 |
| 5,572,634 | * 11/1996 | Duluk, Jr. | 395/119 |
| 5,640,499 | * 6/1997 | Nagai | 395/133 |
| 6,046,722 | * 4/2000 | McKiel, Jr. | 345/145 |

OTHER PUBLICATIONS

Blattner et al., "Multimedia Environments for Scientists," IEEE, pp. 348–353, 1991.*

* cited by examiner

Primary Examiner—Stephen S. Hong
(74) Attorney, Agent, or Firm—Raymond J. Werner

(57) ABSTRACT

Information objects are compared according to user a specified distance measure and the magnitude of this distance measure is reported to a user by producing audio tones representative of the magnitude of the distance measure between the information objects. In one embodiment, a user interface for computers, including audio feedback in which a substantially fixed pitch audio tone is associated with a first selected object, and a second audio tone, associated with a second selected object, varies in pitch as the second object is moved relative to the first object. User configurable audio tone parameters allow the use of any function relating variations in audio tone to a distance measure.

9 Claims, 8 Drawing Sheets

METHOD AND APPARATUS FOR AUDIBLY COMMUNICATING COMPARISON INFORMATION TO A USER

BACKGROUND OF THE INVENTION

1. Field of the Invention

The present invention relates to user interfaces for computer systems. More particularly, the invention relates to audio cues to assist in manipulation of objects in a computer generated environment.

2. Background

Human-computer interactions have changed over the years from batch processing of punched cards, to on-line text-based interactions known as command line interfaces, to the current generation of graphical user interfaces such as are found in use with most desktop personal computers. As the computational capabilities of modern computers have increased so have the uses to which these computers have been applied.

These increases in computational power have led to a number of applications which require the manipulation of computer-generated objects in multi-dimensional environments. Some techniques have been developed to facilitate the placement of objects in two-dimensional (2D) spaces such as the ability to snap to a grid.

Computer applications incorporating three-dimensional (3D) graphics present substantial user-interface challenges due to the increased complexity of the space. Working with objects in 3D can be difficult because of the lack of spatial information afforded by the 3D environment. In the "real world," shadows, texture velocity, specular highlights, reflections, emmisive and reflective light sources, and other information are available to interpret into size, shape, and position. Even photorealistic renderings that are too compute intensive to render in real-time hardly compare to the richness of information provided to our visual senses in the real world.

Physiological factors also play a role in human perception. In the real world, humans rely on binocular vision to help judge depth, although its utility is limited to about 20 meters. A widened field of vision is really the main benefit from having two eyes for tasks such as driving.

Also important to human perception of distance is the information received from real or apparent motion. Motion parallax is the difference in motion across the visual field, for example, as seen out the side window while riding in a car. That is, things near you appear to whiz by, while the horizon seems motionless. Kinetic Depth Effect (KDE), is a related phenomenon that gives us shape information about an object when it, or the human viewer undulates. Human viewers tend to move back and forth, rather than holding heads and eyes in one position. When both human viewer and the viewed objects remain motionless (as in a virtual world), 3D objects may be perceived as flat. The primary problem with creating motion parallax and KDE in the virtual world is limited computer performance. In other words, animation must be imperceptibly smooth to be effective and not annoying. However, frame rates on widely distributed, current generation computer systems are not high enough to produce the proper effect.

Current 3D editors require the user to visually check the size and position of objects. In order to clearly ascertain the size and position of an object in a complex composition in 3D space (3-space), a user may need to switch between several camera angles and/or numeric display of X/Y/Z axial position and rotation. This approach is computationally intensive, tedious, slow, and error-prone.

There is a need for a mechanism for aurally comparing quantitative information.

Further, there is a need for tools to make computer users more effective in 3-space and to overcome the inherent limitations of the artificial 3D environment. Such tools as methods and apparatus for quickly and accurately moving and/or sizing objects in a computer representation of a composition in 3-space would make users of 3D computer applications more effective and efficient.

SUMMARY OF THE INVENTION

The present invention provides a mechanism for aurally comparing quantitative information. Briefly, information objects are compared according to a user specified distance measure and the magnitude of this distance measure is reported to a user by producing audio tones representative of the magnitude of the distance measure between the information objects.

Further, the present invention provides a user interface including audio feedback in which a substantially fixed pitch audio tone is associated with a first selected object, and a second audio tone, associated with a second selected object, varies in pitch as the second object is moved relative to the first object.

User configurable audio tone parameters allow the use of any function relating variations in audio tone to a distance measure.

In an alternative embodiment, the audio cues are synthetic speech rather than variable pitched tones.

DETAILED DESCRIPTION OF THE INVENTION

Figure 1:
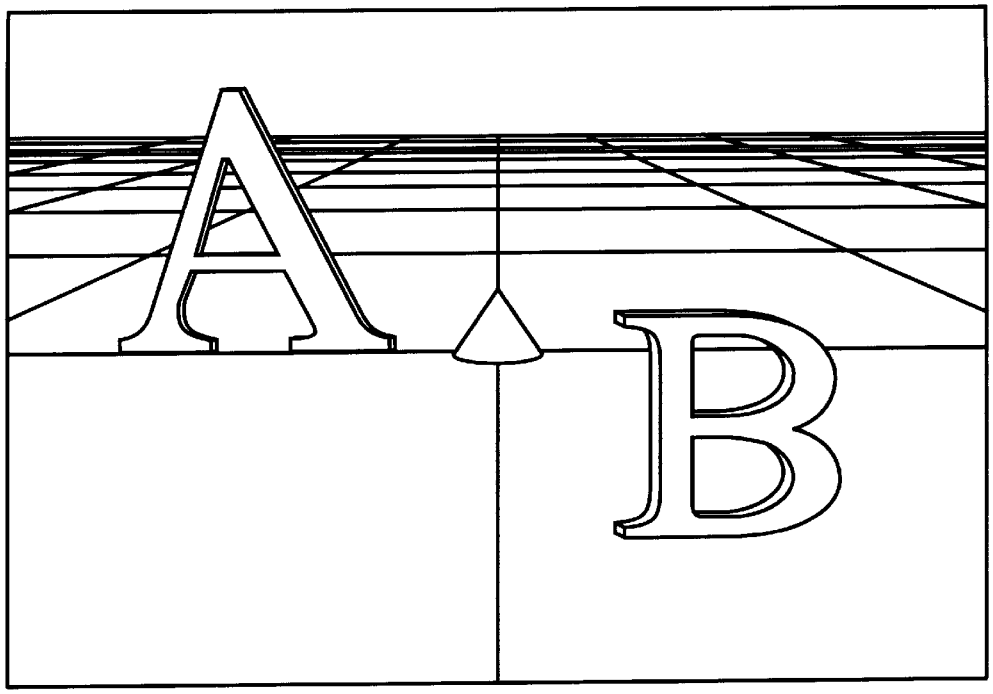
FIG. 1 is a perspective view of two objects in a 3-space composition with a 2D grid and a reference cone.

Visual information is highly subject to vantage point and line of sight. Visually positioning two objects side-by-side in 3-space requires a user to "eyeball" the comparison from two or more angles, judging by distance and/or motion parallax. By presenting information audibly in a computer-generated graphical 3-space environment, the same information obtained from comparison of multiple camera angles, is available independent of the user's vantage point in 3-space relative to the objects being compared. Audio response time is much faster than the fastest graphical rendering typically available today. This can be critically important, especially in process control or augmented reality systems such as are found in neurosurgical visualization systems.

The present invention provides an "audio-ruler" method and apparatus which allows quantitative information to be communicated to a user by sound.

Terminology

User interface refers to the aspects of a computer system or program which can be seen, heard or otherwise perceived by a user of the computer system and the commands and mechanisms used to both control operation of, and input data to, the computer system.

Mouse refers to a common kind of input device connected to a computer system, also known as a pointing device. A mouse is moved over a flat horizontal surface and includes some means of converting its position in two dimensions into X-Y coordinates which the computer can read. The mouse has one or more buttons whose state can also be read by the computer to which it is attached. It is called a mouse because the wire connecting it to the computer or keyboard looks like a mouse's tail. Trackballs and joysticks are input devices with similar functionality. Wireless pointing devices that communicate with a computer by, for example, infrared signaling, are also available and provide functionality substantially similar to that of the mouse.

A window (or windowing) system refers to a facility which allows a computer display screen to be divided into, typically, rectangular areas each of which acts like a separate input/output device under the control of different application programs. This gives the user the ability to see the output of several processes at once and to choose which one will receive input by selecting its window, usually by pointing at it with an input device such as a mouse. A part of the window system called the window manager can arrange windows on a display screen by moving and resizing windows in response to user input or requests from applications programs running on the computer system. Window systems are typically implemented as software running on a computer, although hardware acceleration of some window functions are sometimes used. The hardware/software tradeoffs are design choices well-understood by those of ordinary skill in the field of window systems.

Graphical user interface (GUI) refers to the use of pictures rather than just words to represent the input and output of a program. A program with a GUI runs under some windowing system (e.g., Microsoft Windows®). The program displays certain icons, buttons, and dialogue boxes in its windows on the screen, and the user controls it mainly by moving a pointer on the screen (typically controlled by a mouse) and selecting certain objects by pressing buttons on the mouse while the pointer is pointing at them.

A command line interface requires the user to type textual commands and input at a keyboard, and produces a single stream of text as output.

Function key refers to a key on a computer keyboard, the activation of which instructs the computer to take a predetermined action.

Multimedia refers to human-computer interaction involving text, graphics, audio, voice and video.

Audio output device refers to speakers, headphones or any other device that can generate sound waves which can be perceived by a computer user.

The term object as used herein refers to a computer representation of some manipulable information. A typical object is a visible computer-generated graphic. Such an object may represent data of any kind, text, files, video, audio, and so on, or may simply be a drawing element in a graphical design. An object may be invisible, i.e., undisplayed.

Texture velocity refers to the frequency in a texture pattern as it increases when farther away from an observer. For example, consider a rug, a road, or even a field of grass, when looking straight down an observer sees the pattern one way, but as the observer looks further and further out towards the horizon, the repeat of the pattern appears smaller and smaller because of the angle and distance.

A hypercube refers to a cube of more than three dimensions. A single ($2^0=1$) point (or "node") can be considered as a zero dimensional cube, two ($2^1$) nodes joined by a line (or "edge") are a one dimensional cube, four ($2^2$) nodes arranged in a square are a two dimensional cube and eight ($2^3$) nodes are an ordinary three dimensional cube. Continuing this geometric progression, the first hypercube has $2^4=16$ nodes and is a four dimensional shape (a "four-cube") and an N dimensional cube has $2^N$ nodes (an "N-cube"). To make an N+1 dimensional cube, take two N dimensional cubes and join each node on one cube to the corresponding node on the other. A four-cube can be visualized as a three-cube with a smaller three-cube centered inside it with edges radiating diagonally out (in the fourth dimension) from each node on the inner cube to the corresponding node on the outer cube. Nodes in an N dimensional cube are each directly connected to N other nodes. Each node can be identified by a set of N Cartesian coordinates where each coordinate is either zero or one. Two nodes will be directly connected if they differ in only one coordinate.

Click refers to the user action of pressing a button on a mouse or other pointing device. This typically generates an event, also specifying the screen position of the cursor, which is then processed by the window manager or application program.

Select refers to the act of clicking when the position of the cursor overlaps the position of a displayed object.

Drag refers to the user action of selecting an object by clicking on it, and then moving the selected object by moving the mouse while continuing to hold down the mouse button.

Click, select and drag are fundamental operations in a GUI system.

Audio-ruler refers to the use of audio cues to provide information to a user regarding the magnitude of an arbitrary attribute of an object relative to a reference object.

MIDI refers to the Musical Instrument Digital Interface published by the MIDI Manufacturers Association, Los Angeles, Calif., USA. More information about MIDI technology can be obtained from the World Wide Web site of the MIDI Manufacturers Association, which can be found at http://home.earthlink.net/~mma/index.html Hue/Lightness/Saturation (HLS) refers to a scheme for specifying color that is more natural than the RGB (red, green, blue, additive colors scheme) or the CMYK (cyan, magenta, yellow, black, subtractive colors scheme).

The 3-D Graphical Environment

Figure 2:
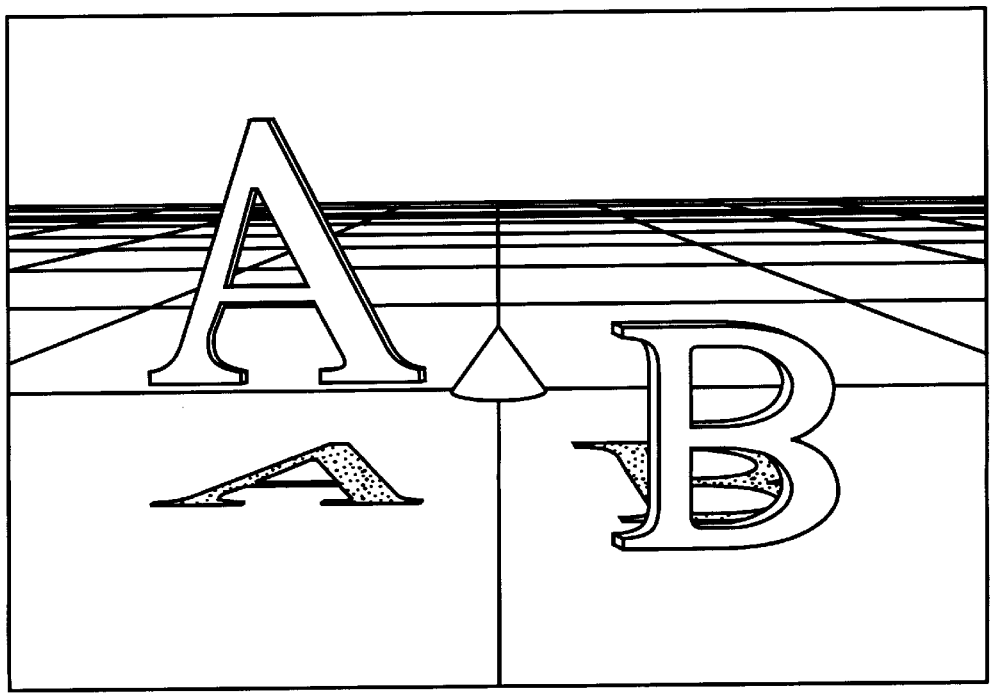
FIG. 2 is the same as FIG. 1 but with false shadows projected from the objects to the X-Z plane.
Figure 3:
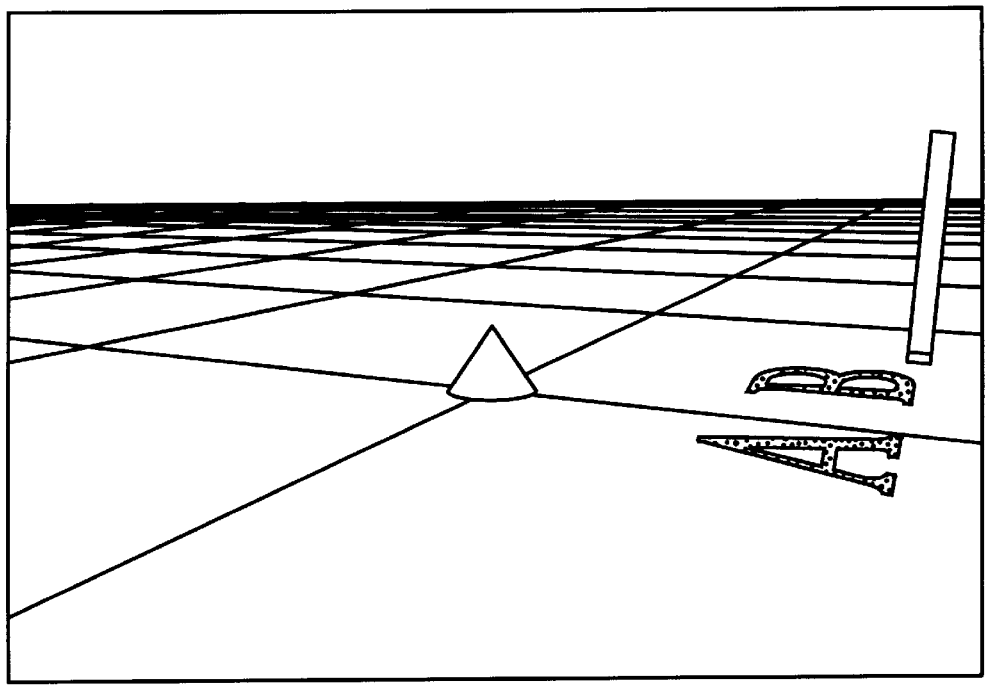
FIG. 3 is a side view of the image of FIG. 2.
Figure 4:
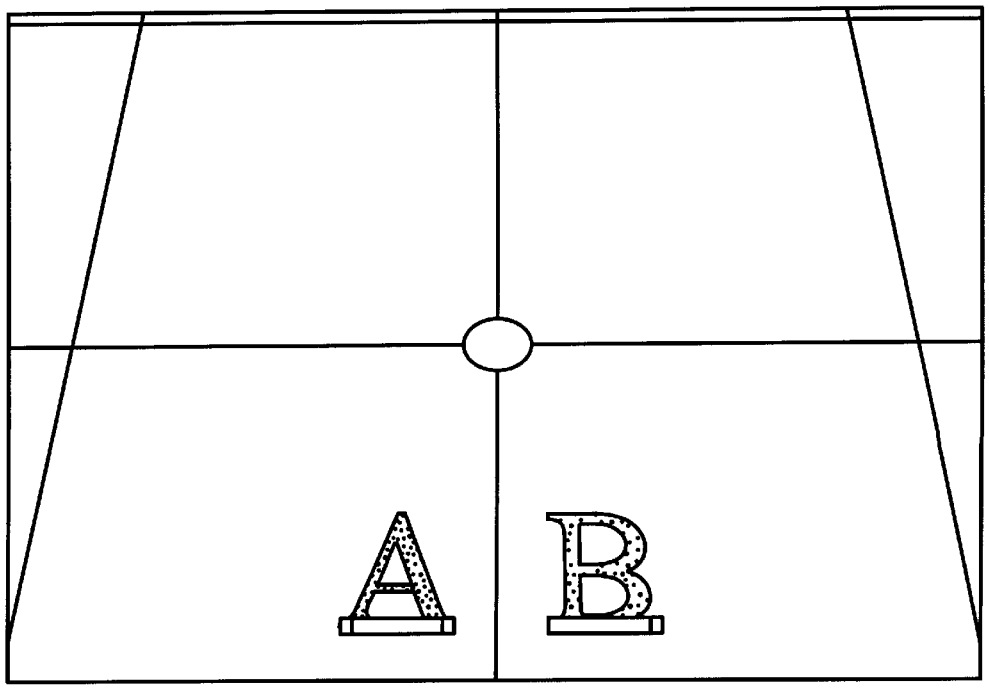
FIG. 4 is a top view of the image of FIG. 2.
Figure 5:
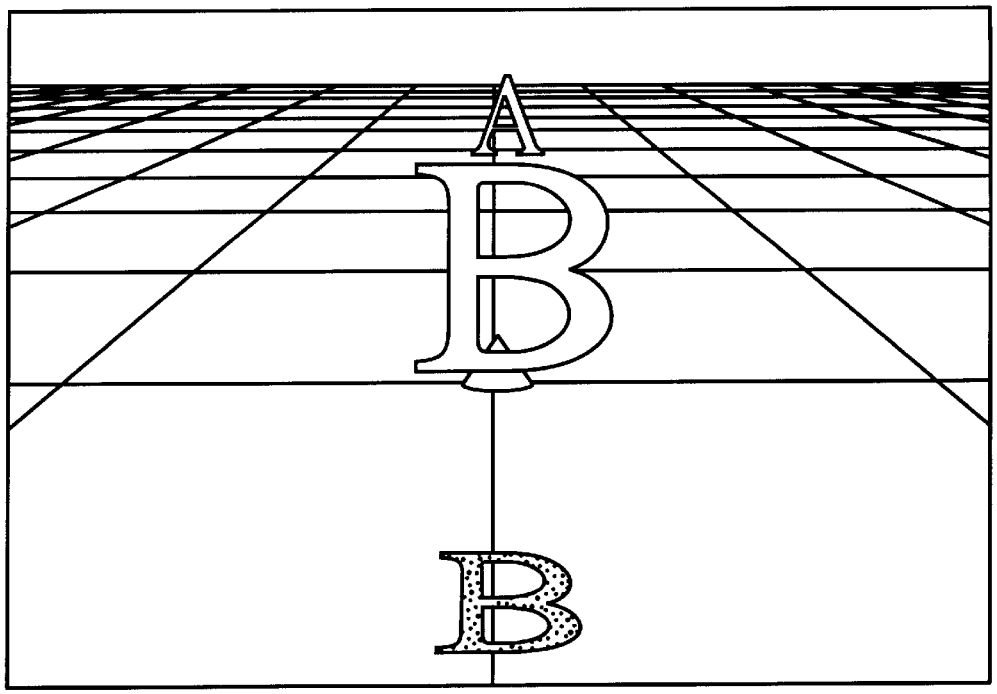
FIG. 5 shows another example of a perspective view of two objects in a 3-space composition with a 2D grid and a reference cone.
Figure 6:
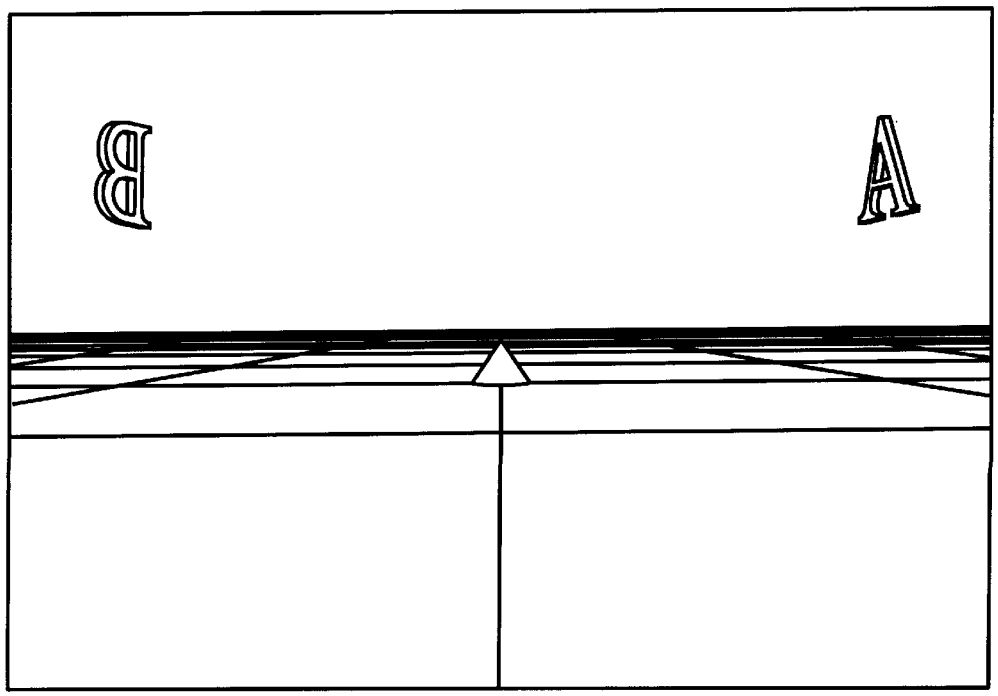
FIG. 6 shows the 3-space composition of FIG. 5 rotated 90 degrees in the X-Z plane.

Referring to FIGS. 1–4 and 5–6, the difficulty of positioning graphical objects in a 3D environment will be described. FIG. 1 is a front view of a first object 100 and a second object 102. The visual cues available to an observer indicate that second object 102 is nearer to the observer than first object 100. FIG. 2 provides a view of objects 100, 102 with a shadow 104, and a shadow 106 projected onto the X-Z plane. The visual cues provided by projected shadows 104, 106 indicate that object 100 and object 102 are actually at the same Z-axis location and that object 100 is only higher than object 104. The term "shadow" in this context is used as a term of art, since no single light source could generate such shadows. These "false" shadows are used for illustrative purposes to show that the true spatial relationship of objects 102, 104 can only be determined by viewing the composition from more than one camera angle. FIG. 3 is a side view illustrating how object 102 actually obscures object 104, making object 104 unviewable from this camera angle.

Collectively, FIGS. 1–6 illustrate the difficulty of determining the true spatial relationship of objects in a 3-space composition without viewing the composition from several camera angles. One problem with viewing multiple camera angles is the excessive time required by typical computers to render these scenes.

The General Method

Figure 7:
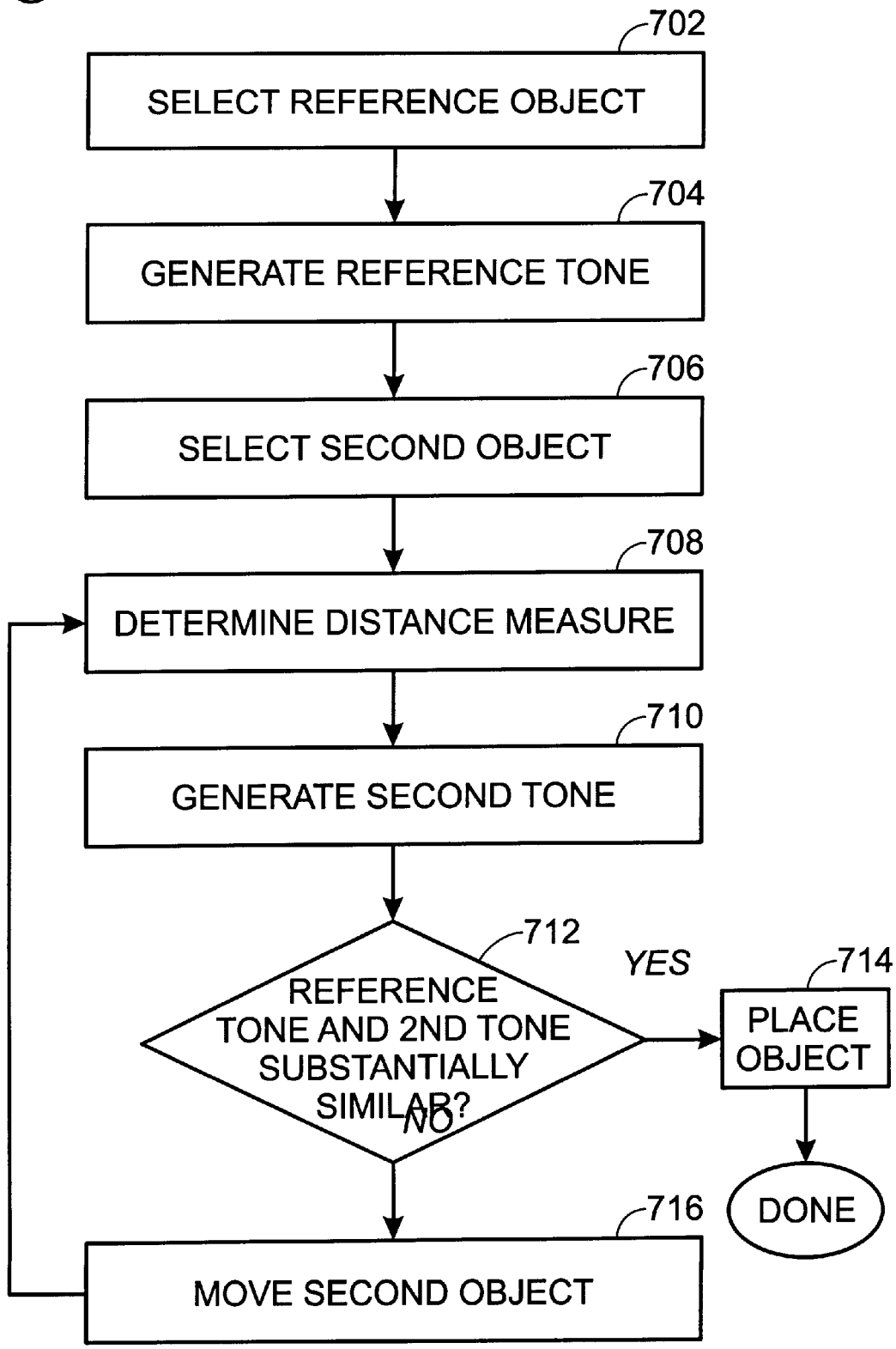
FIG. 7 is a flowchart illustrating the method of the present invention.

Referring to FIG. 7 a preferred embodiment of the present invention is described. In a step 702, a user of a computer system having a visual display and audio output capability, selects a first one of the objects displayed on the visual display as a reference object. In a step 704, the computer system then generates a first audible tone having a substantially fixed pitch. This is referred to as toning. Typically this pitch is middle C (261.63 Hz) in an instrument timbre corresponding to the selected axis. Of course, any other pitch could be used, for example the A above middle C (440 Hz). In a step 706, a second object which is to be positioned, or aligned, with respect to the reference object is then selected. In a step 708, the distance measure between the reference object and the second object is determined. The computer system then, in a step 710, generates a second audible tone having a variable pitch. The pitch of the second audible tone is generated as a function of the distance measure between the reference object and the second object. The pitch of the second audible tone approaches the pitch of the first audible tone as the distance measure is reduced. The pitch of the first and second audible tones are substantially the same when the distance measure is reduced to zero, or is within some user selected value, δ, of zero. In a step 712, the reference tone and the second tone are compared and if the tones are substantially similar, then in a step 714, the second object is placed, i.e., deselected and left in its current location. If the comparison of step 712 finds the tones to be not substantially similar, then in a step 716, the second object is further moved and the process repeats from step 708 until the user is satisfied with the location of the second object.

The reference tone should be chosen for a particular application based on factors such as how much room is required above and below the reference. Also whether environmental considerations favor a higher or lower reference tone. Higher tones tend to be perceived more clearly in a noisy environment, however many people have hearing deficiencies at the high end of the human audible spectrum.

The Distance Measure

The distance measure represents the magnitude of an arbitrary attribute of an object relative to a reference object. For example the distance measure may be the point to point distance in 3-space between a point $P_1=(x_1, y_1, z_1)$ in the reference object, and a point $P_2=(x_2, y_2, z_2)$ in the selected second object, as given by the Equation (1).

$$\text{Distance}=\sqrt{(x_2-x_1)^2+(y_2-y_1)^2+(z_2-z_1)^2} \quad \text{Equation (1)}$$

In this case the points $P_1$ and $P_2$ may be chosen arbitrarily by the user. That is, $P_1$ and $P_2$ may be the center points of their respective objects, the lower left hand corner points, the points with the greatest magnitude y coordinates, or any other user defined algorithm for selection of these points.

Alternatively, the distance measure may represent the distance in a single dimension, or axis, between a point $P_1=(x_1, y_1, z_1)$ in the reference object, and a point $P_2=(x_2, y_2, z_2)$ in the selected second object, as given by the Equations (2)–(4).

$$\text{Distance}=x_2-x_1 \text{ where X is the selected single dimension} \quad \text{Equation (2)}$$

$$\text{Distance}=y_2-y_1 \text{ where Y is the selected single dimension} \quad \text{Equation (3)}$$

$$\text{Distance}=z_2-z_1 \text{ where Z is the selected single dimension} \quad \text{Equation (4)}$$

These examples of distance measures are scalable to N dimensions where N is a number greater than zero.

The distance measure can not only be made between two points, as described above, but between any two objects such as a line segment, a ray, a line, a circle, a plane, a polygon, a cube or any higher dimensional objects such as hypercubes or hyperspheres. The distance measure may be made to any arbitrary collection of points which make up the reference and selected objects.

In some circumstances a user may wish to include an offset in the distance measure computation. In other words, rather than trying to make the values of the reference and selected objects equal, the user desires to achieve a fixed offset in N-space between the reference and selected objects. As an example of this, Equation (2) is modified as follows:

$$\text{Distance}=x_2-(x_1+\text{offset}) \text{ where X is the selected single dimension} \quad \text{Eq. (5)}$$

The distance measure is not limited to the representation of the difference between physical locations, but can also represent other physical quantities including but not limited to such as the magnitude of a voltage difference, the magnitude of a temperature difference, the magnitude of rotor speed difference, the magnitude of manifold pressure difference and so on.

Specific Example—Apparatus

Figure 8:
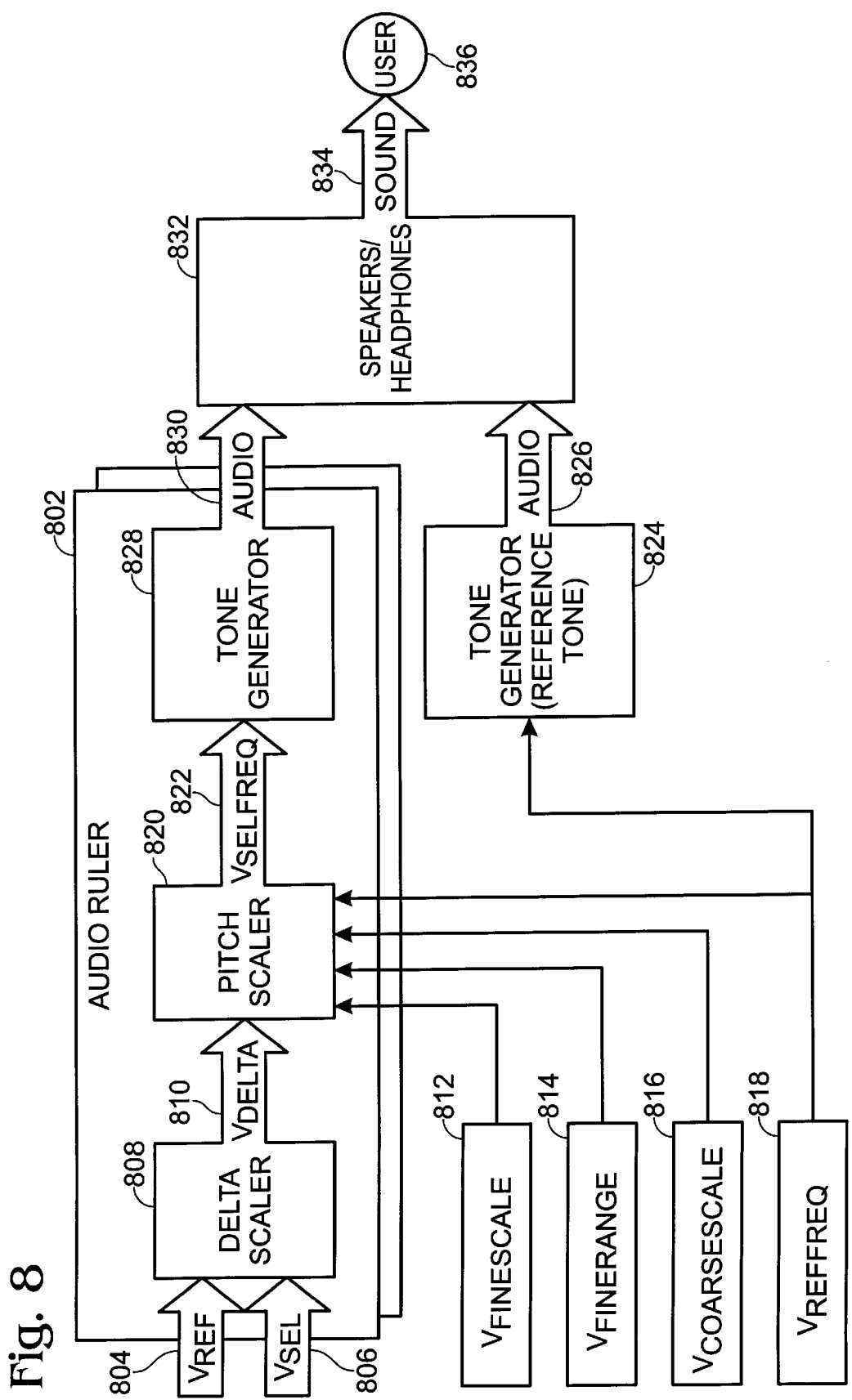
FIG. 8 is a block diagram of the audio-ruler system of the present invention.

Referring to FIG. 8, an embodiment of the present invention is described. An audio-ruler 802 is typically coupled to a computer system such as a personal computer having a graphic display, a user input device, and audio output device. Audio-ruler 802, has a delta scaler 808, which receives a reference signal Vref as an input signal 804, and a comparison value Vsel as input signal 806. Vref represents the position in n-space of the reference object. Vsel represents the position in n-space of the object selected for comparison. Delta scaler 808 provides an output signal Vdelta 810 which is coupled to a pitch scaler 820. User programmable control inputs VfineScale 812, VfineRange 814, VcoarseScale 816 and VrefFreq 818 are also coupled to pitch scaler 820. Each of user programmable control inputs VfineScale 812, VfineRange 814, VcoarseScale 816 and VrefFreq 818 may be registers to which the computer writes information and from which pitch scaler 820 reads the information. Alternatively, these user programmable control inputs may be computer memory locations from which pitch scaler 820 reads information, or the user programmable control inputs may be potentiometers set by slides or knobs. The only requirements for the user programmable control inputs are that the user can vary their value, and that pitch scaler 820 can be coupled to these control inputs. Pitch scaler 820 provides an output signal VselFreq 822 which is coupled to a tone generator 828. Tone generator 828 provides an output signal 830 which is coupled to an audio output device 832. User programmable control input VrefFreq 818 is also coupled to a reference tone generator 824 which provides output signal 826. Output signal 826 is coupled to audio output device 832. Audio output unit 832, may be any device, such as speakers or headphones, capable of producing audible sounds. Audio output device 832 provides an audible output 834 which is heard by a user 836. The functionality of the various blocks of audio-ruler 802 can be implemented in either an analog or digital manner. The preferred embodiment of the present invention implements delta scaler 808, VfineScale 812, VfineRange 814, VcoarseScale 816, VrefFreq 818 and pitch scaler 820 in the digital domain.

Audio Scaling Function

Because the magnitude of the distance measure between the objects to which an audio-ruler can be applied can vary greatly, it is useful to have an audio scaling function which maps, or translates, the steps of the distance measure into steps of the selected pitch scale. Delta Scaler 808 performs this audio scaling function.

Delta Scaler 808 compares the two input values 804, 806, determines the distance measure, and then generates a resultant delta value, Vdelta 810 as an output. The transfer function of delta scaler 808 is chosen to match the scale(s) of Vref 804 and Vsel 806 so as to produce an output scale with the desired response curve and precision.

The output delta scale can be any function (e.g., linear, log, exponential), so long as the scale is monotonically increasing with increasing difference between Vref 804 and Vsel 806. For example, a Delta Scaler that compares linear Vref and Vsel and produces a linear Vdelta could operate on the input signal as follows:

Vdelta=(Vsel—Vref)/scale_factor where scale_factor is chosen to produce the desired sensitivity (precision) to differences in Vref and Vsel.

Pitch scaler 820 produces a monotonically increasing VselFreq above VrefFreq with increasing values of Vdelta>0 and a monotonically decreasing VselFreq below VrefFreq with decreasing values of Vdelta<0. VselFreq 822 is generated by a bimodal function where the first function, the "fine scale" (as enumerated by VfineScale) is applied when Vdelta is within +/−VfineRange, else the second function, the "coarse scale" (as enumerated by VcoarseScale) is applied. Scales VfineScale 812 and VcoarseScale 816 may include but are not limited to functions such as linear, log, and exponential, or "musical" scales including but not limited to chromatic, major, minor, diatonic, harmonic, melodic, enharmonic, pentatonic, twelve-tone, Lydian mode, Phrygian mode, Dorian mode, and mixolydian. In this way, the most appropriate scale can be selected for the application, taking into account the desired number of steps, as specified in VfineRange 814, user skill, locale (Eastern scale), and task.

Control input VfineRange 814 is used by pitch scaler 820 to determine the number of steps in the VfineScale before switching to VcoarseScale. In a typical application, the range of values covered by VfineScale defines a fine-grained "target" area, while the VcoarseScale provides simpler, ballistic control information. That is, in the coarse range, small pitch changes in a continuous tone convey sufficient feedback to user 836 to indicate whether they are moving farther away from, or closer to the goal state. User 836 detects being within fine range when the continuous-sweep tone becomes step-wise. With a properly selected VfineScale, user 836 can estimate the interval between VrefFreq and VselFreq with sufficient accuracy for the given application task.

Generating Audible Tones

Tone generators 824, 828 can be any one of a number of sound-producing mechanisms, including, but not limited to, digital or analog oscillators, MIDI-controlled synthesizers, and speech synthesizers. The audio output of tone generators 824, 828 can be any signal that when input to speakers or headphones produces an audible tone including, but not limited to, a variable-pitch audio tone of any quality or duration.

Figure 9:
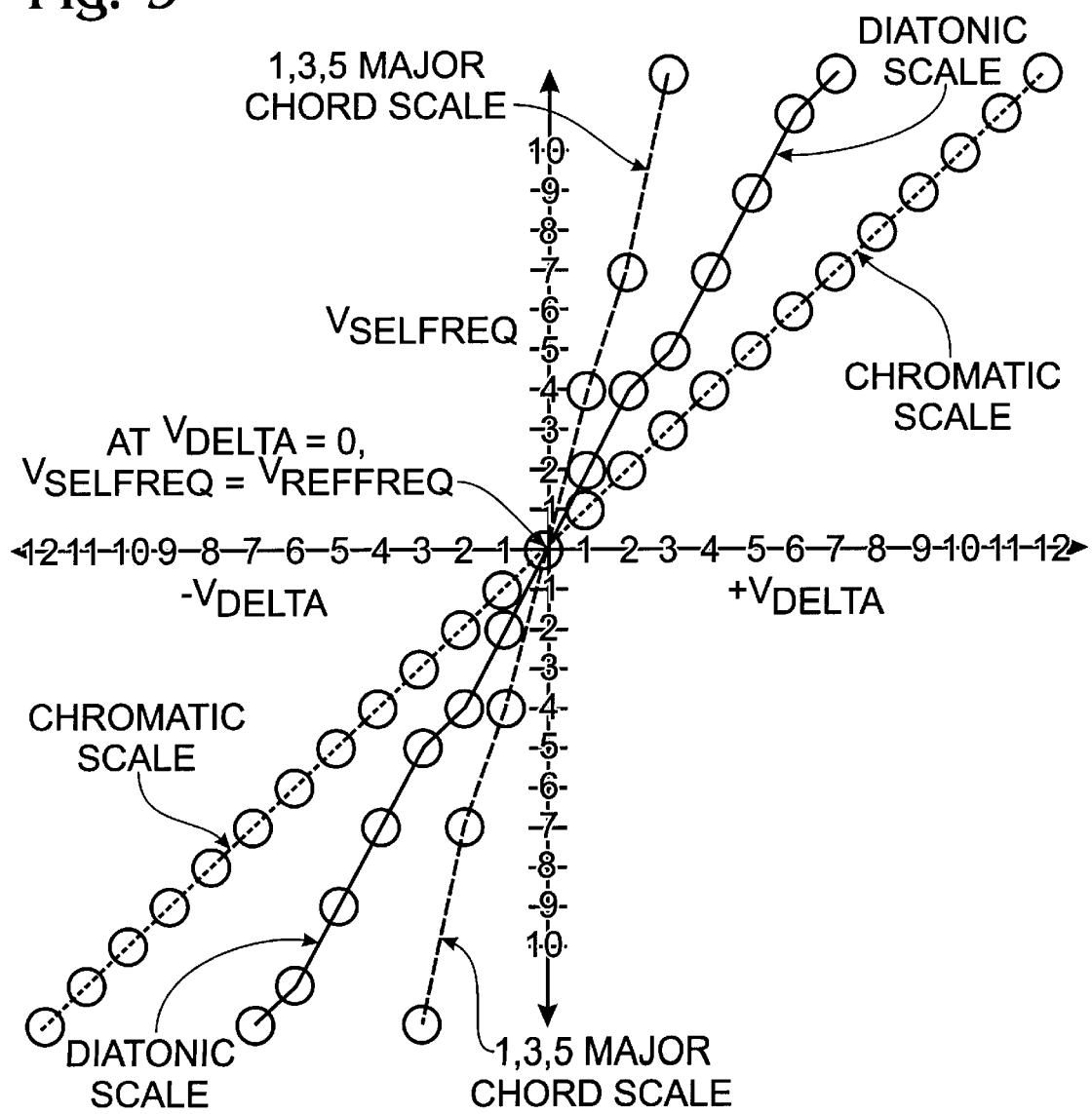
FIG. 9 shows various mappings of the distance measure onto audio scales.

In a preferred embodiment of the present invention tone generator 824, is a MIDI synthesizer. Pitch information, i.e., VselFreq 822, received by tone generator 828 from pitch scaler 820 is a number between 1 and 127 inclusive, where middle C is 60. The Chromatic scale is expressed simply as VselFreq=VrefFreq+Vdelta. FIG. 9 illustrates the lookup values required by other scales, where at Vdelta=0, VselFreq=VrefFreq. For example, using the major chord scale yields the following:

|  | MIDI |
| --- | --- |
| Vdelta + 1 = middle C + 4 | 64 |
| Vdelta + 2 = middle C + 7 | 67 |
| Vdelta + 3 = middle C + 12 | 72 |

Whereas, again referring to FIG. 9, using the diatonic scale yields:

|  | MIDI |
| --- | --- |
| Vdelta + 1 = middle C + 2 | 62 |
| Vdelta + 2 = middle C + 4 | 64 |
| Vdelta + 3 = middle C + 5 | 65 |

Speakers, headphones, and other related audio components such as an amplifier or a mixer are selected according to needs of the particular application of the present invention. Selection of these audio components is well understood by those of ordinary skill in the field of audio components.

Specific Example—Method

There are many possible applications and variations of the present invention. Described below is a specific embodiment of the present invention in a system for positioning objects in a computer-generated 3-space.

Figure 10:
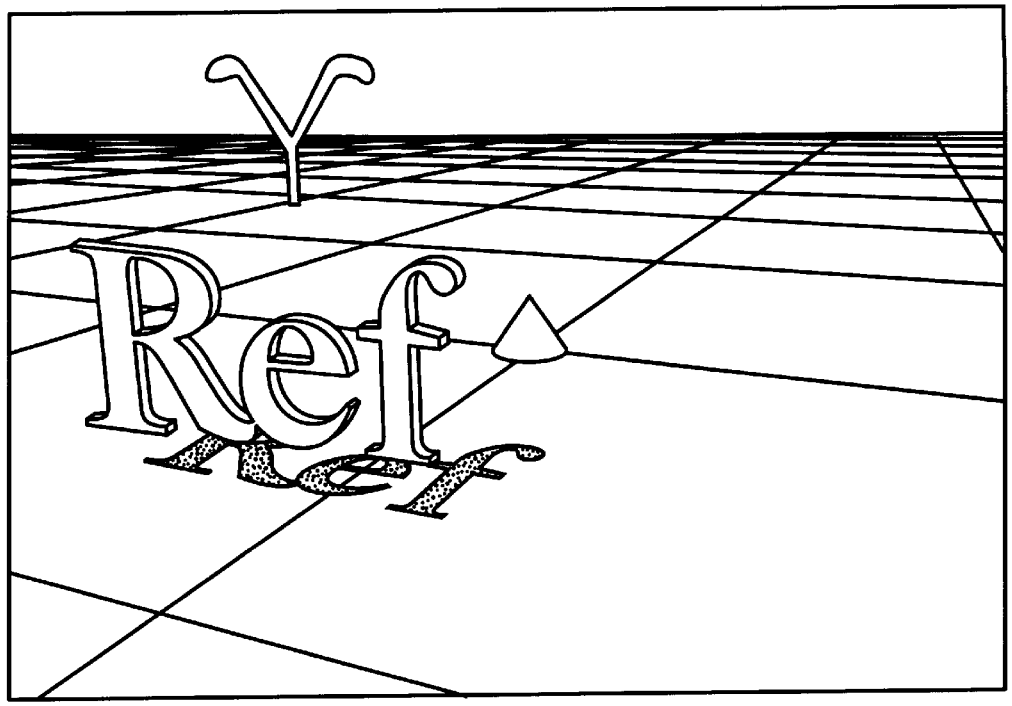
FIG. 10 illustrates a reference object and an axis indicator in accordance with the present invention.

1. A user selects a reference object.
2. The user presses a function key to toggle "reference toning" of the reference object. Different function keys are used to toggle the X, Y, and Z axes.
3. The reference object begins to continuously sound an audio tone of "middle C" in an instrument timbre corresponding to the selected axis. For example, the X-axis may sound a square wave, Y-axis may sound a triangle wave, and Z-axis may sound a "breathy" pan pipe sound. The user may reconfigure these timbres and reference pitch as desired.
4. The computer system generates a display which visually indicates the reference object and its toning axis by placing an X, Y, or Z character above the reference object. As shown in FIG. 10 an object "Ref" 1002 is toning and typically tones in middle C. A graphical indicator "Y" 1004 indicates that other objects will tone their Y position relative to "Ref" 1002.

5. Optionally, the user may select a different object in the 3D graphical environment.

Figure 11:
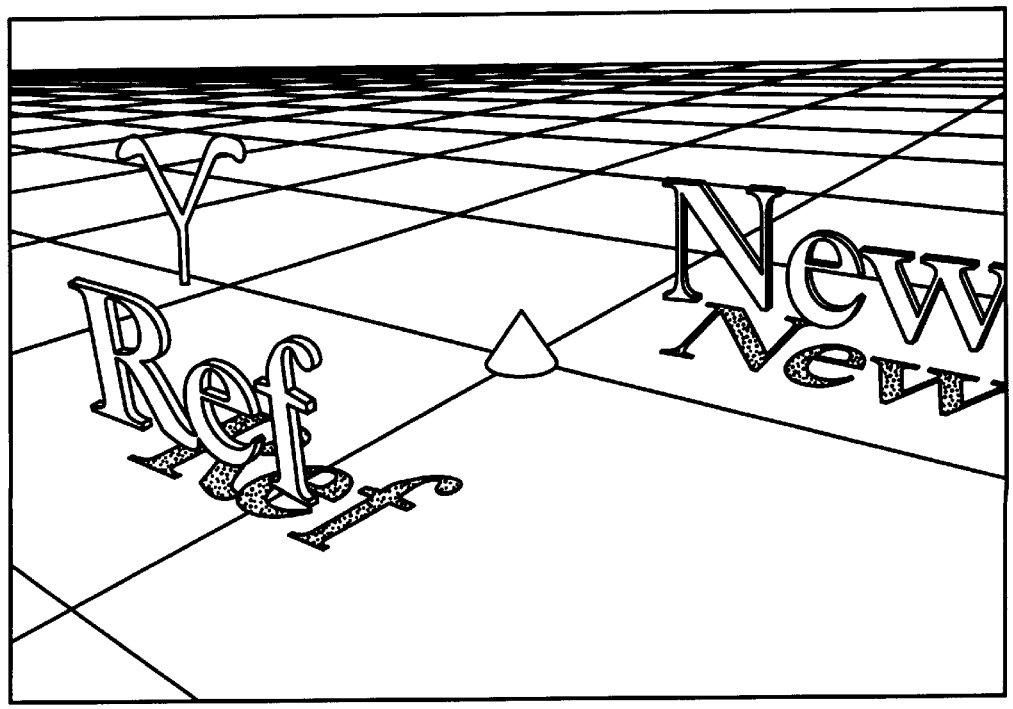
FIG. 11 illustrates a selected object relative to the reference object in accordance with the present invention.

6. The newly-selected object continuously sounds an audio tone corresponding to its distance from the reference object along the selected axis. This tone is updated with any positional change of the selected object. For example, if the object is moved closer to the reference object, the tone moves closer to that of the reference object. In one embodiment, the distance is linearly scaled to produce a corresponding pitch on the chromatic scale. However, other distance and pitch scaling may be chosen and are user selectable options. As shown in FIG. 11, an object "New" 1102 has been positioned at the same height (Y) as "Ref".

Figure 12:
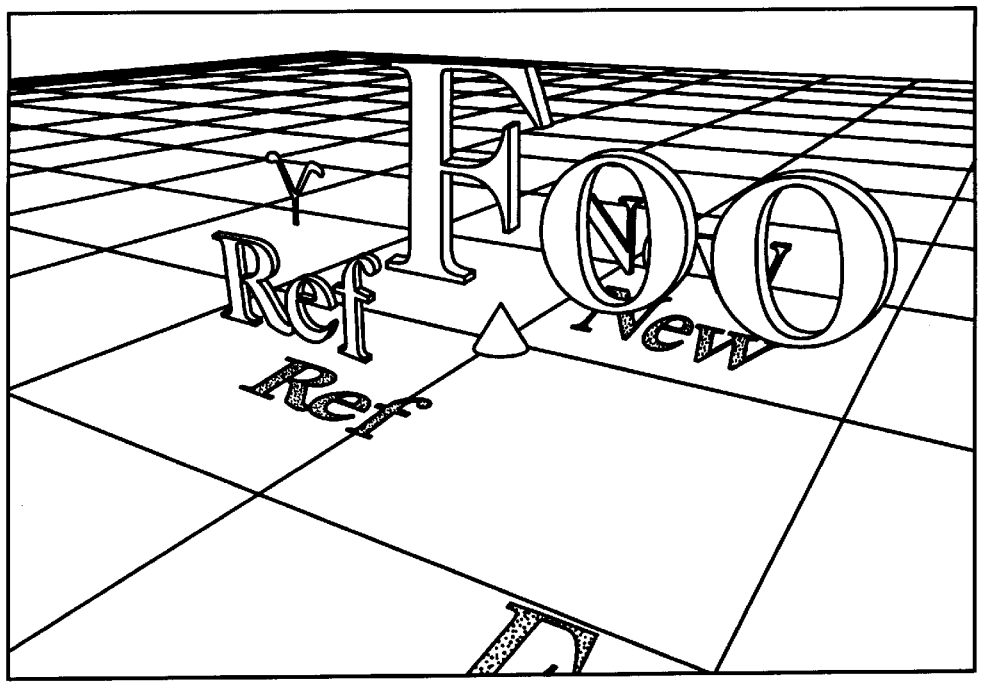
FIG. 12 illustrates a more complex version of the scene depicted in FIG. 11, with selected and deselected objects.
Figure 13A:
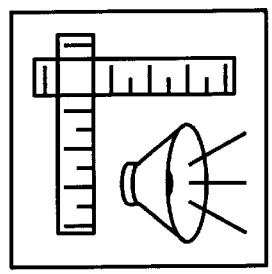
FIGS. 13(a)–(d) show examples of audio-ruler user interface icons.
Figure 13B:
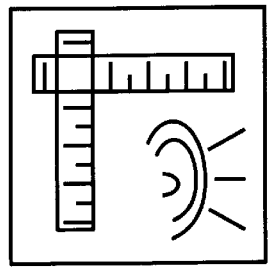
Figure 13C:
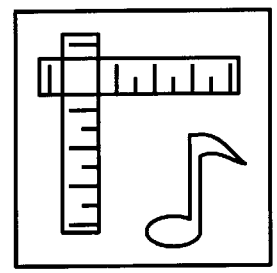
Figure 13D:
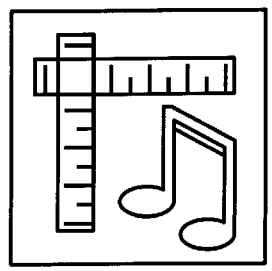

7. If a third object is selected, the second object stops toning (corresponding to its deselection) and the third object begins toning as described above. As shown FIG. 12, an object "Foo" 1202 has been selected and is some distance above reference object, "Ref."

8. The user may turn off all toning by deselecting all objects and pressing the function key corresponding to the currently-toning axis.

Variations and Options

There are many possible variations of the above-described method, all of which can be user programmable. Some examples of this include, but are not limited to, the reference pitch which may be any frequency, not just middle C; the reference timbre which may be anything such as a square wave, a triangle wave, a flute sound and so on; the selected-node timbre likewise can be anything such as a square wave, a triangle wave, a flute sound and so on, and may be a different timbre from the reference timbre; tones can be positioned anywhere in the stereo space for binaural stimulation or separation (i.e., panning); reference tone could be placed in one ear with target tones placed in the other; Spatial audio can be used as additional coding, although by itself spatial audio is currently believed to be too coarse for accurate measurement.

Different applications may require different scales. One example can be found in absolute measurements, where the goal is to reduce the difference between the selected and reference objects, the difference in pitch conveys the magnitude of distance measure between them, with both objects sounding substantially the same pitch at the goal state. A second example can found in interval measurements, where the goal is to arrange N objects with K world units between each of them. In such a case it is useful to employ a musical scale such that the arrangement of properly spaced objects results in an aesthetically pleasing tonal structure, such as a major chord. These different scales may be obtained by configuring the pitch scaler to the desired interval ("grid").

Graphical user interfaces for computer system often include icons, which are ornamented areas of the computer display screen where, when the cursor is located in that area of the screen and the mouse is clicked, some action is taken. Examples 30 of audio-ruler icon ornamental designs are shown in FIGS. 13(a)–(d).

Alternative Signaling—Speech and Sonar Styles

In an alternative embodiment of the present invention, a constant-pitch audio tone whose output is a timed interval of tone pulsations (beats) per second inversely proportional to VselFreq is used. This is referred to as the sonar model:

bing . . . . bing . . . . bing . . bing . . bing . bing beep

In a further alternative embodiment of the present invention, user feedback is provided by synthetic speech rather than variably pitched tones. In this embodiment a distance measure is converted into speech based cues. These cues include, but are not be limited to, readouts of the coordinates of the moving object, and simple positive/negative words, e.g., "warmer, colder", indicating respectively whether moving object is getting closer to, or farther from the reference object. Even a is speech sequence such as the following is possible:

"Cold. Cold. Cold. Warmer. Warmer. Colder. Warmer. Getting Warm. WARMER. WARMER! WARMER!!! Hot! HOT! BINGO!"

Extending the Audio-ruler to Other Applications

The present invention can be used in virtually any circumstance, graphical or not, to help a user determine any arbitrary attribute, setting, or parameter with respect to some reference. Presenting information audibly also frees the visual senses to concentrate on something else. For example, applying the functionality of the present invention in a voltage meter, could tell a technician whether the voltage at a test point was higher or lower than a reference voltage without the technician taking his or her eyes off of the probe.

Some examples of these applications are provided immediately below.

a) Adjusting the size of objects in a 2D or 3D graphical environment.

b) Color matching, where HLS or RGB parameters are the "axis".

c) Aircraft piloting where a reference tone is set at desired altitude, throttle setting, rotor speed, manifold pressure, or the like. The pilot's eyes are then free to focus on other aspects of flying the aircraft.

d) Measuring the similarity of text files; and e) For process control, measuring speed, temperature, percent completion, radiation levels, and so on.

Conclusion

Rather than trying to replicate all natural information in the artificial domain, alternative techniques to convey the most important information in an efficient way are provided by the present invention.

The present invention provides a mechanism which augments visual information with audible tones. Users compare the position, size, or any other attribute of two or more objects by comparing their simultaneous audio tones; the farther apart the objects are in that dimension, the farther apart will be their corresponding tones. This technique is useful in a variety of environments, even non-graphical ones like text files, voltage meters, aircraft throttles, and so on.

The present invention can be embodied in the form of methods and apparatuses for practicing those methods. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention.

When implemented on a general-purpose microprocessor, the computer program code segments combine with the microprocessor to provide a unique device that operates analogously to specific logic circuits.

It will be understood that various changes in the details, materials, and arrangements of the parts and steps which have been described and illustrated in order to explain the nature of this invention may be made by those skilled in the art without departing from the principles and scope of the invention as expressed in the subjoined claims.

What is claimed is:

1. A method of positioning an object, said method comprising:
   a) selecting a first object;
   b) generating a first audible tone;
   c) selecting a second object, said second object being positioned a distance from said first object;
   d) generating a second audible tone, said second audible tone being associated with said second object; and
   e) aligning said second object to said first object;
   f) wherein the first audible tone and the second audible tone are different when the first and second objects are not aligned, the first and second tones are the same when the first and second objects are aligned and the first and second audible tones are produced substantially simultaneously.

2. The method of claim 1, wherein said first audible tone has a substantially fixed pitch.

3. The method of claim 1, wherein said second audible tone has a pitch that varies as a function of the distance between said first and second objects.

4. The method of claim 1, wherein said step of moving said second object comprises moving said second object along a pre-selected axis.

5. The method of claim 1, wherein said step of generating said second audible tone comprises the steps of:
   comparing a first and a second set of coordinates associated respectively with said first and second objects, said coordinates being representative of the relative positions of said first and second objects;
   determining the distance between said first and second objects; translating said distance into audio control information representative of pitch;
   outputting said audio control information to a tone generator; and
   producing said second audible tone.

6. The method of claim 5, wherein said first audio tone has a substantially fixed pitch.

7. The method of claim 5, wherein said distance is a distance along a pre-selected axis.

8. The method of claim 1, further comprising, prior to said step (e) of moving said objects, the step of selecting an axis in which to move said second object.

9. A method of co-locating, in at least one axis, computer generated graphical objects in a computer generated scene representing a three-dimensional scene, comprising:
   a) selecting an axis in three dimensional space along which a distance between a first graphical object and a second graphical object is to be determined;
   b) selecting a first graphical object;
   c) generating a first audible tone associated with said first graphical object;
   d) selecting a second graphical object;
   e) generating a second audible tone associated with said second graphical object, said second audible tone being a function of the distance between said first graphical object and said second graphical object;
   f) moving said second graphical object along said selected axis until said first and second audible tones are substantially equal; and
   g) displaying an indication of the selected axis.

* * * * *